United States Patent [19]
Denoize et al.

[11] Patent Number: 5,878,819
[45] Date of Patent: Mar. 9, 1999

[54] DEVICE FOR ASSISTING WITH THE EXTINGUISHING OF FIRES BY WATER-BOMBING AIRCRAFT

[75] Inventors: Xavier Denoize; François Faivre, both of St Medard; Roger Parus, Merignac, all of France

[73] Assignee: Sextant Avionique, Velizy Villacoublay, France

[21] Appl. No.: 875,403

[22] PCT Filed: Jan. 30, 1996

[86] PCT No.: PCT/FR96/00148

§ 371 Date: Dec. 19, 1997

§ 102(e) Date: Dec. 19, 1997

[87] PCT Pub. No.: WO96/23549

PCT Pub. Date: Aug. 8, 1996

[30] Foreign Application Priority Data

Jan. 31, 1995 [FR] France .................................. 95 01098

[51] Int. Cl.⁶ ................. A62C 3/02; B64D 1/18
[52] U.S. Cl. ............... 169/53; 169/61; 239/171; 244/136
[58] Field of Search .................. 169/53, 56, 60, 169/61, 36; 239/171; 244/136, 137.1, 137.4; 701/213, 214

[56] References Cited

U.S. PATENT DOCUMENTS

| | | | |
|---|---|---|---|
| 3,901,467 | 8/1975 | Hawkshaw | 244/136 |
| 5,549,259 | 8/1996 | Herlik | 244/136 |
| 5,749,889 | 8/1998 | Bailey | 244/136 |

FOREIGN PATENT DOCUMENTS

| | | |
|---|---|---|
| 9302749 | 2/1993 | France . |
| 9408660 | 4/1994 | France . |
| 9315955 | 8/1993 | United Kingdom . |

Primary Examiner—Andres Kashnikow
Assistant Examiner—Dinh Q Nguyen
Attorney, Agent, or Firm—Oblon, Spivak, McClelland, Maier & Neustadt, P.C.

[57] ABSTRACT

A device for assisting the extinguishing of fires by water-bombing aircraft. The device includes at least one sensor for sensing the source of the fire, a device for pinpointing the position of the aircraft, a geographical database and a calculator for calculating the route of the aircraft as a function of its position and the position of the source as pinpointed in the database.

20 Claims, 3 Drawing Sheets

DEVICE FOR ASSISTING WITH THE EXTINGUISHING OF FIRES BY WATER-BOMBING AIRCRAFT

BACKGROUND OF THE INVENTION

1. Field of the Invention

The present invention relates to a device for assisting with the extinguishing of fires by water-bombing aircraft. It is particularly applicable to firefighting.

DISCUSSION OF THE BACKGROUND

The development of firefighting techniques using water-bombing aircraft has greatly increased in popularity, particularly for combating fires in places which are particularly difficult to access over land or are remote from reserves of water.

However, manoeuvring these aircraft and dropping the water accurately are still difficult areas and there have regrettably been a number of failures or accidents in these problematic phases.

At the present time there are barely any systems dedicated to detecting and pinpointing the sources of fires. The systems employed are in fact the location systems with which an aircraft is conventionally equipped, using procedures of flying by sight and visually identifying the sources.

SUMMARY OF THE INVENTION

The object of the invention is to allow the crew of water-bombing aircraft, particularly when smoke is present, to better pinpoint the source of the fire, and therefore the point to be extinguished, and possibly to transmit the location to other carriers, optimise the route of the aircraft and the route of the water and finally secure a safe escape route for the water bombers. In particular, the system assists with avoiding obstacles hidden by the smoke.

Thus the subject of the invention is a device for assisting with the extinguishing of fires by a water-bombing aircraft, characterized in that it has at least one sensor for sensing the source of the fire, means for pinpointing the position of the aircraft, a geographical database and means for calculating the route of the aircraft as a function of the position of this aircraft and of the position of the source as pinpointed in the database.

The main advantages of the invention are that it adapts to all types of relief of the ground and all types of weather conditions, that it is simple to use and that it is economical.

BRIEF DESCRIPTION OF THE DRAWINGS

Other features and advantages of the invention will become clear from the description which follows, given with reference to appended drawings which represent.

DISCUSSION OF THE PREFERRED EMBODIMENTS

Figure 1:
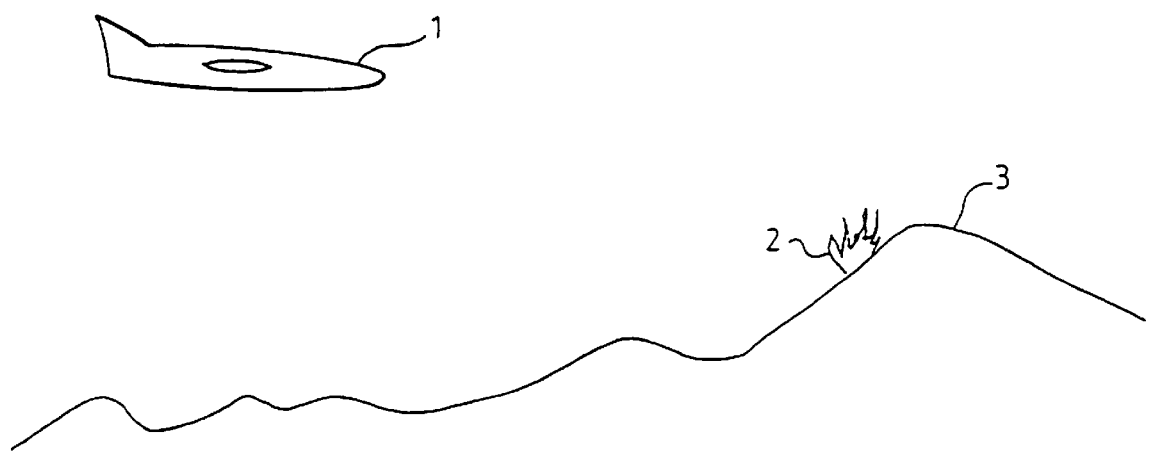
FIG. 1 a water-bombing aircraft approaching the source of a fire.

FIG. 1 shows a water-bombing aircraft 1 approaching the source of a fire 2, the aircraft being equipped with a device according to the invention. It comprises at least one sensor for sensing the source of the fire. This sensor is, for example, an external sensor sensitive to temperature. This sensor is, for example, an infrared camera which allows the source of the fire to be located precisely in terms of elevation and bearing relative to the aircraft by human identification and/or automatic processing.

The aircraft 1 also has means for pinpointing its position, for example in altitude, latitude and longitude, as well as attitudes. These means are, for example, known navigational systems.

Figure 2:
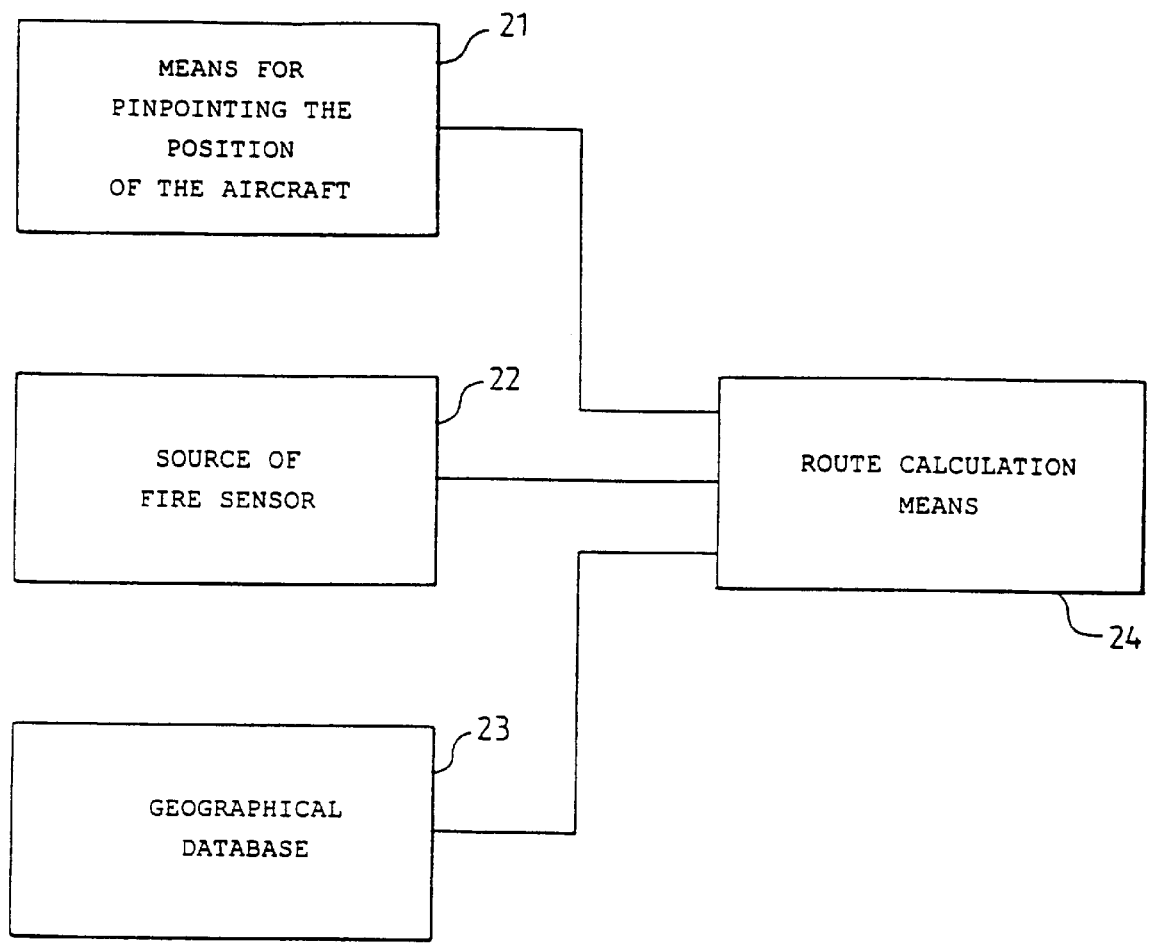
FIG. 2 in a block diagram, one possible embodiment of a device according to the invention.

FIG. 2 shows a block diagram of one possible embodiment of a device according to the invention. The device has at least means 21 for pinpointing the position of the aircraft in which they are placed, a sensor 22 for sensing the sources of fires, a geographical database 23 and algorithmic computation means 24 allowing, for example, location, guidance and dropping.

The geographical database 23 which is in fact a terrain database, has in memory a grid of the surrounding terrain in latitude, longitude and altitude. The positions of the aircraft 1 and of the source 2 are pinpointed in the database relative to the aforementioned grid. This pinpointing is performed, for example, by the algorithmic computation means 24. These then calculate, for example, the route which will allow the aircraft to fly in in the safest and best way for dropping its payload. These means for example decide when to display a drop signal, bearing in mind the exit route the aircraft will have to take to avoid the relief 3.

The computation means 24 therefore have for example the purpose of reconstructing deviation and guidance signals from:

the known position of the aircraft;

the known direction of the source of the fire as given by the sensor 22 in terms of elevation and bearing relative to the aircraft, it being possible, for example, for the sensor to be an infrared sensor. Means of identifying a part of the source may, for example, be provided if the source is large;

the database 23 which knows the relief of the land and is thus better able to perceive the route in the vertical and horizontal plane;

the calculated position of the fire in terrestrial co-ordinates from calculations which work out how to convert the direction of the line of sight given for the sensor 22 in the aircraft reference plane into a ground reference plane using the attitude data on the one hand, and the intersection of the line of sight with the database on the other hand.

From this data, the computation means calculate an ideal route and therefore guidance commands to be given to the crew of the aircraft. A drop water calculation, which takes account of the attitude of the aircraft, its altitude, its speed and the wind speed, for example, processes the ballistics of the water payload.

The escape route calculation may, for example, also take the reduced mass of the aircraft into account.

Figure 3:
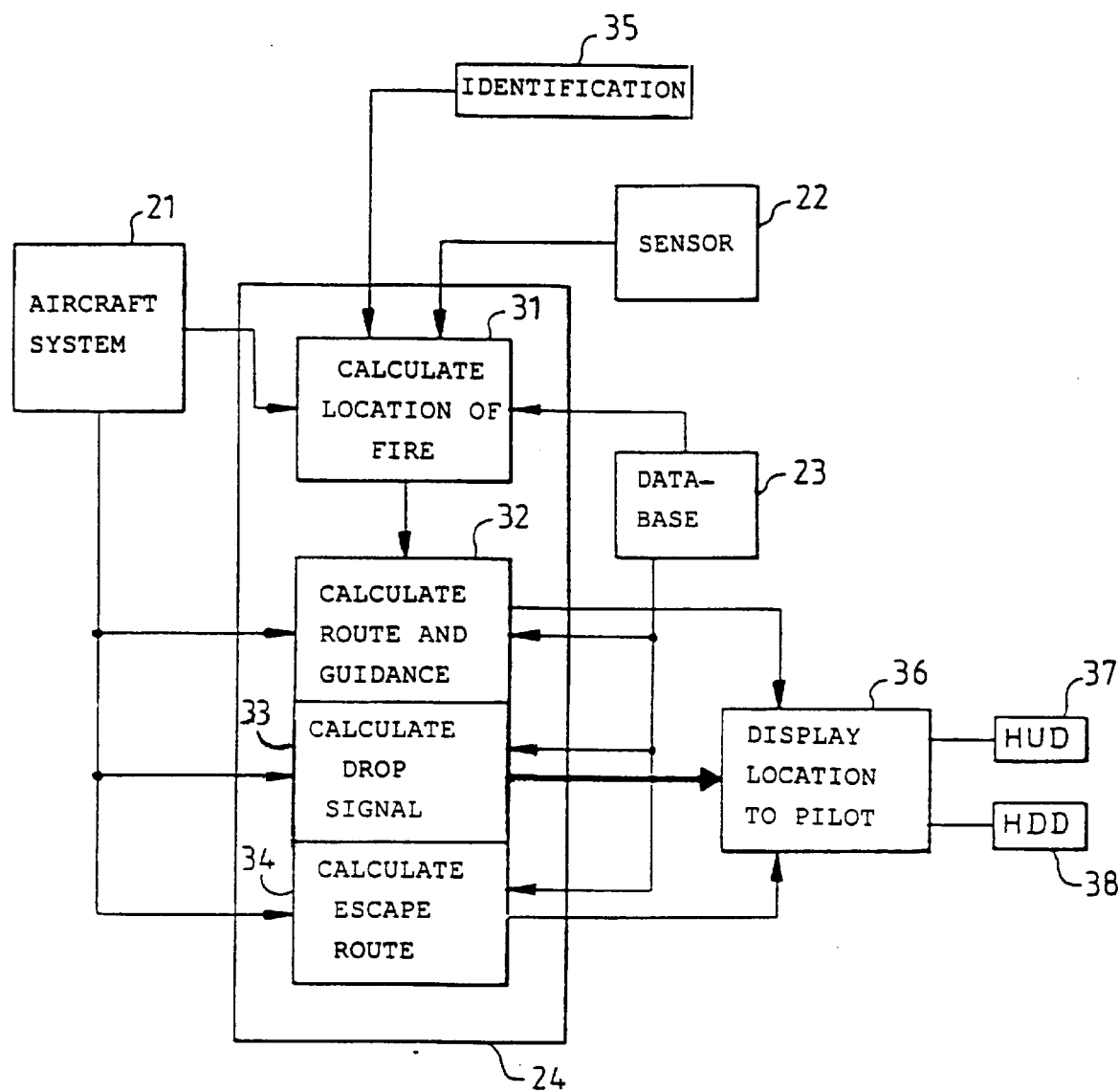
FIG. 3 an example of a possible embodiment of a device according to the invention.

FIG. 3 shows an example of a possible embodiment of a device according to the invention.

The means 21 for pinpointing the position, attitude and orientation of the aircraft consist, for example, of the aircraft system such as GPS and IRS in particular, GPS being known in the trade as the initials for the expression "Global Positioning System" and IRS as being the initials for the expression "Inertial Reference System".

The means 24 for calculating the route consist, for example, of a computer 31 for locating the source of the fire, a route and guidance computer 32, a computer 33 for determining the drop signal and a computer 34 for calculating the aircraft escape route after the water has been dropped. These various computers can be combined into one or more computers.

They can also, for example, be produced on one and the same semi-conductor chip.

The computer 31 which locates the fire is connected to the means 21 for pinpointing the position of the aircraft, to the aircraft system for example, to the sensor 22 and to the geographical database 23. Knowing the position of the aircraft with respect to the database thanks to the pinpointing means 21, and the direction of the source with respect to the aircraft thanks to the sensor 22, the computer 31 can then define the location of the fire with respect to the database and therefore its precise geographical location.

The location computer 31 is for example also connected to identification means 35 for identifying, in particular, a part of the source of the fire if the source is large. Identification may be human and/or carried out by automatic processing.

The route and guidance computer 32 is for example connected to the aircraft system 21 and to the geographical database 23 as well as to the fire-location computer 31. It can therefore calculate the optimum route as a function of the location of the water-bombing aircraft with respect to the location of the source of the fire to be extinguished with the aid of the database, in particular in order to fly through an optimum dropping point and to avoid obstacles.

The drop signal computer 33 is connected for example to the computer 32 and to the aircraft system 21 to determine the moment at which the signal to drop the water should be given as a function of the route and the speed of the aircraft, of its height and altitude and of the speed and direction of the wind, this information originating, for example, from the aircraft system or from a value transmitted from the ground, as well as of any other parameter for calculating the ballistics of the payload of water to be dropped, especially its mass.

Generation of the drop signal may also, for example, be determined as a function of the line of sight, this for example being calculated by the drop signal computer 33. The drop signal is therefore generated as a function of the position of the point at which the line of sight intersects the geographical database 23, the point of intersection being calculated by the drop signal computer 33. For this purpose, the database 23 is in particular connected to this computer 33. The drop signal may, for example, be given after a countdown.

The computer 33 for calculating the drop signal is, for example, connected to means 36 for displaying location data to the pilot. These means 36 are in particular intended to interface the computers 32,33, 34 with visual or acoustic display means.

The drop signal produced may, for example, be given visually and/or acoustically. If it is a visual signal, the latter may therefore be delivered, for example, to a head-up display 37 and/or to a head-down display 38.

The use of a head-up display furthermore allows the guidance and launch parameters to be displayed in the same way as the landscape.

The escape route computer 34 is connected for example to the aircraft system 21, to the geographical database 23 and to the drop signal computer 33. This route is therefore calculated as a function of the speed of the aircraft, of the terrain, the latter being provided by the database 23, and of the moment the water is to be dropped. The escape route calculation may, for example, take into account the mass of the aircraft reduced by its water payload.

The route and guidance computer 32 and the escape route computer 34 are similarly, for example, connected to the means 36 for displaying location to the pilot.

The various items of data provided by these computers 32, 33, 34 may be displayed to the pilot superimposed on the external landscape through the use of a head-up display. They may also be displayed to the pilot in the form of appropriate symbols, for example using a head-down display.

The device according to the invention can also, with the aid of its aforementioned route calculating means, provide the pilot with guidance data for all low-visibility operations. It may also, for example, provide information needed for guiding the aircraft during operations of filling it over all types of water reservoir.

The use of the device according to the invention has been described with reference to the dropping of a payload of water. However, this device is suitable for dropping all types of product intended for extinguishing fires.

We claim:

1. Device for assisting with the extinguishing of fires by a water-bombing aircraft, characterized in that it has at least one sensor for sensing the source of the fire, means for pinpointing the position of the aircraft, a geographical database and means for calculating the route of the aircraft as a function of the position of this aircraft and of the position of the source as pinpointed in the database.

2. Device according to claim 1, characterized in that the geographical database has in memory a grid of the surrounding terrain in latitude, longitude and altitude.

3. Device according to claim 1, characterized in that the means of calculating the route of the aircraft comprise:
   a computer for locating the source of the fire, connected to the means for pinpointing the position of the aircraft, to the sensor and to the geographical database;
   a route and guidance computer connected to the location computer, to the means for pinpointing the position of the aircraft and to the geographical database;
   a drop signal computer connected to the route and guidance computer, to the means for pinpointing the position of the aircraft and to the geographical database;
   a computer for calculating the escape route of the aircraft connected to the drop signal computer, to the means for pinpointing the position of the aircraft and to the geographical database.

4. Device according to claim 3, characterized in that it comprises means for identifying the source of the fire.

5. Device according to claim 3, characterized in that the drop signal computer determines the instant at which this signal is sent as a function of the speed of the aircraft, its position, the wind speed and the mass of the payload of water to be dropped.

6. Device according to of claim 3, characterized in that since the drop signal computer calculates the line of sight of the aircraft, it generates the drop signal as a function of the position of the point at which the line of sight intersects the geographical database, the computer also calculating this point of intersection.

7. Device according to claim 1, characterized in that the means for pinpointing the position of the aircraft consist of the aircraft system.

8. Device according to claim 1, characterized in that the sensor is sensitive to temperature.

9. Device according to claim 8, characterized in that the sensor is an infrared camera.

10. Device according to claim 1, characterized in that the means of calculating the route of the aircraft are connected to means for displaying information to the pilot, the information being supplied superimposed on the external landscape using a head-up display and/or in the form of symbols on a head-down display.

11. Device according to claim 10, characterized in that the drop signal is given acoustically.

12. Device according to claim 4, characterized in that since the drop signal computer calculates the line of sight of the aircraft, it generates the drop signal a function of the position of the point at which the line of sight intersects the geographical database, the computer also calculating this point of intersection.

13. Device according to claim 5, characterized in that since the drop signal computer calculates the line of sight of the aircraft, it generates the drop signal a function of the position of the point at which the line of sight intersects the geographical database, the computer also calculating this point of intersection.

14. Device according to claim 2, characterized in that the means for pinpointing the position of the aircraft consist of the aircraft system.

15. Device according to claim 3, characterized in that the means for pinpointing the position of the aircraft consist of the aircraft system.

16. Device according to claim 4, characterized in that the means for pinpointing the position of the aircraft consist of the aircraft system.

17. Device according to claim 5, characterized in that the means for pinpointing the position of the aircraft consist of the aircraft system.

18. Device according to claim 6, characterized in that the means for pinpointing the position of the aircraft consist of the aircraft system.

19. Device according to claim 12, characterized in that the means for pinpointing the position of the aircraft consist of the aircraft system.

20. Device according to claim 13, characterized in that the means for pinpointing the position of the aircraft consist of the aircraft system.

* * * * *